No. 619,770. Patented Feb. 21, 1899.
F. L. LOETZ.
RIP SAW GAGE.
(Application filed Dec. 12, 1898.)
(No Model.)
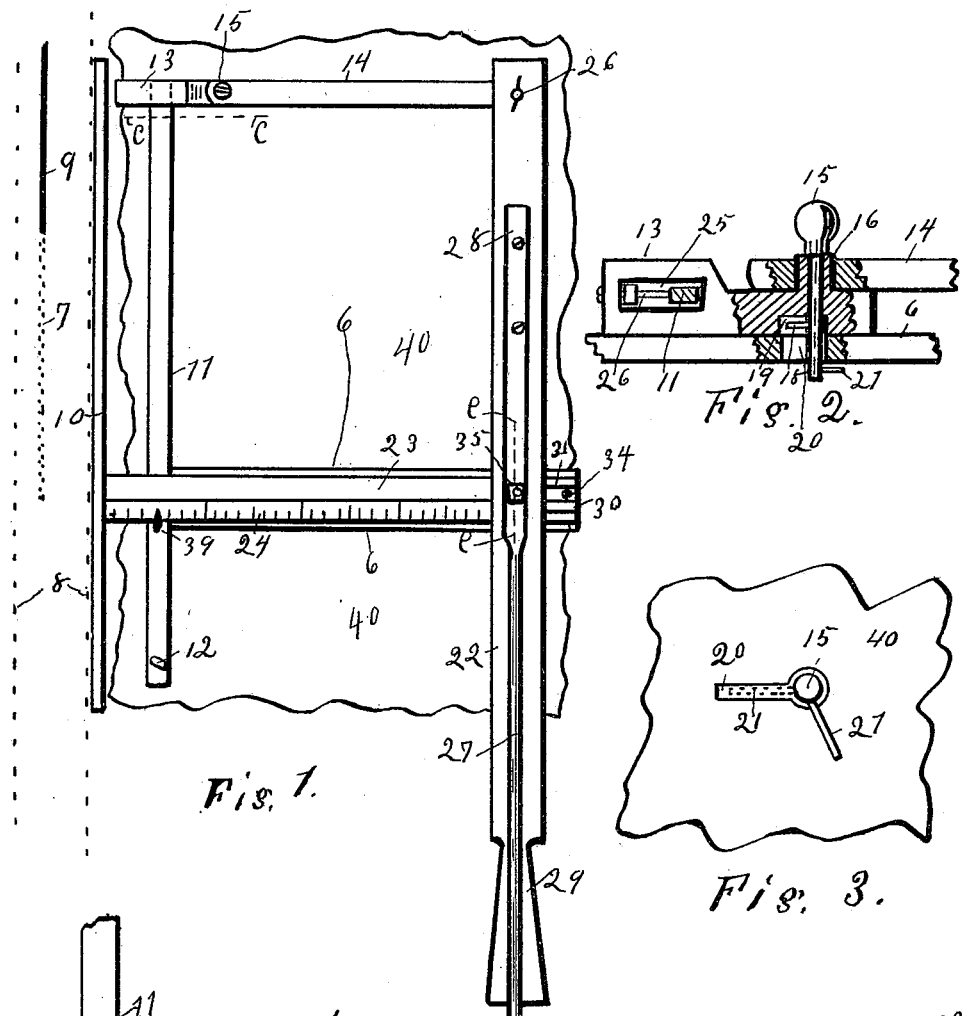

UNITED STATES PATENT OFFICE.

FREDERICK L. LOETZ, OF STURGIS, MICHIGAN.

RIP-SAW GAGE.

SPECIFICATION forming part of Letters Patent No. 619,770, dated February 21, 1899.

Application filed December 12, 1898. Serial No. 699,098. (No model.)

*To all whom it may concern:*

Be it known that I, FREDERICK L. LOETZ, a citizen of the United States, residing at Sturgis, in the county of St. Joseph, State of Michigan, have invented a new and useful Rip-Saw Gage, of which the following is a specification.

This invention relates to saw-gages which can be adjusted to govern the different widths of the strip or piece of wood being sawed.

The object of the invention is to facilitate and make accurate the operation in a speedy manner by the construction below described and claimed.

In the drawings forming a part of this specification, Figure 1 is a plan view, the table which supports the saw-gage being shown broken; Fig. 2, an enlarged view taken in section on line $c\ c$ in Fig. 1 looking from below, parts being broken away, showing the pivotal attachment of the bar; Fig. 3, an inverted plan of Fig. 2; Fig. 4, an enlarged plan of the parts below the laterally-sliding bar which bears the rule or measure, and Fig. 5 is an enlarged section on line $e\ e$ in Fig. 1 looking from a point at the right.

Referring to the parts of the drawings pointed out by numerals, 40 is the top of the table which supports the saw-gage below described, the saw being shown or indicated by dotted lines 7, the piece of wood being sawed shown by dotted parts 8, and the sawed slit in said piece of wood being shown by the mark 9. A bar 10, Fig. 1, parallel with the saw, is laterally movable toward and away from the saw in accordance with the desired point for slitting the piece of wood 8. A bar 11, which is parallel with bar 10, is pivoted to the table-top at 12. Connected with the other end of said bar 11 is a bar at right angles thereto, made of two parts 13 and 14, which parts are pivoted together at 15 and to the table-top by the same thumb-pivot at 15, Figs. 1 and 2. The part 13 of the bar has an upwardly-extending round portion 16 passing up through the end of the part 14 of said end bar and forming a pivotal bearing, as in Fig. 2. In the under side of the part 13, at 19, is a cut-out portion to admit of the play of a pin 18, said cut-out portion being shown at 19. This pin 18 is inserted in pivot 15 after said headed pivot 15 is inserted through the parts 13 and 14. The table-top has a slot through it at 20, Figs. 2 and 3, to allow a pin 21, which is fixed in lower end of pivot 15, to pass through, as in Fig. 2. Then by giving the headed pivot 15 a partial turn the parts 13 and 14 are held together in a pivoted condition, and both of said parts are held attached in a detachable condition to the table-top 40. The dotted pin 21 in Fig. 3 shows it coming down through the slot 20, and the pin 21 in full lines in Fig. 3 shows the position of said pin after the pivot 15 has been turned to detachably attach the parts 13 and 14 to the top 40. The attachment of the bar 11 at the other end to the table-top may be the same as at 15, the pivot being shown at 12. By means of the pivot at 15 the operating-lever 22 can make the proper movements laterally to cause the bar 10 to move in a straight position parallel with the saw 7 when adjusting for the desired width to slit up the wood piece or strip 8. A bar, which may be called a "rule-bar," 23, bearing a rule 24, is firmly attached at one end to the guide-bar 10 and is attached at the other end in a detachable manner to the operating-lever 22, as in Figs. 1 and 5.

It should have been stated that the attachment of bar 11 with 13 is by making an elongated slot 25 in part 13, as in Fig. 2, and attaching the end of bar 11 therein by an adjusting-screw 26, so that the bar 11 can be moved to the right or left to make accurate the adjustment, so that the bar 10 may always move in parallel angle to the saw 7 or at any other angle desired.

The operating-lever 22 is pivoted to the right-hand end of bar 14 at 26, Fig. 1. An elastic lock-lever 27 is firmly attached at one end 28 to the operating-lever 22, Fig. 1, and the other end of the lock-lever 27 comes over and above the handle end 29 of the operating-lever 22, so that both the end of lock-lever and handle end of operating-lever can be grased in the hand and pinched together, for the purpose explained in the operation. The endwise-moving rule-bar 23 has sliding bearings on strips 30 and 31, said strips being separated, as in Figs. 4 and 5, and one of them being internally beveled, as at 32' in Fig. 5. One of the strips 30 is provided with elongated or enlarged holes 32, Fig. 4, through which the attaching-screws 33 are passed. The object of this is in order that the strips 30 and 31 may be drawn nearer together or farther apart and held by the adjusting-screws 34 between their two ends, in accordance with the needed pressure of the lock-plunger 35, Fig. 5. This lock-plunger is passed down through the rule-bar 23, or, rather, through it and through an upward projection of the same, (shown at 36,) which projection is round and forms a pivotal fulcrum at this point for the operating-lever 22. The operating-lever is held in place by a collar keyed onto the upper end of the projection 36, as 37. To return to the lock-plunger, its upper end is attached to the elastic bar 27 by means of jam-nuts 38, Fig. 5.

At 39 is a pointer which registers with the rule-marks on the rule 24. Bed-strips 6 on table 40 support strips 30 and 31. The end of the bed-strip 6 which is nearest to the guide-bar 10, or the left-hand end, is firmly attached to the bar 11, as in Figs. 1 and 4.

In the operation the guide or saw-gage having been properly adjusted is attached to the table-top in the desired place, then the strip of wood is put in place which is to be sawed. By pressing down on the elastic lever the lock-plunger is released from the wedging engagement with the inner sides of the strips 30 and 31, when by moving the operating-lever 22 in the desired direction laterally the proper space is left between the saw 7 and the guide or gage bar 11. The spring or elasticity of the elastic bar 27 and the bevel of the lower end of the lock-plunger 35 and that at 32' of the strip 31 make a detachable lock to hold the adjustment temporarily where it is desired in accordance with the width of the strip of board being sawed. The desired and exact width to saw is of course fixed by the pointer 39 on the rule 24, or, rather, pointing to the marks on said rule.

Having thus described my invention, what I claim as new, and desire to secure by Letters Patent of the United States, is—

1. In a saw-gage, a gage-bar, an operating-bar, the separated adjustable guide-strips and the lock-plunger adapted to engage the inner surface of said strips to lock the gage-bar in position, all combined substantially as set forth.

2. In a saw-gage, a gage-bar, an operating bar or lever, a spring-bar upon it, guide-strips beneath at right angles thereto and attached to the bar 11, said guide-strips being laterally adjustable, one of them being internally beveled, and a lock-plunger having a beveled side and arranged to be operated to engage the inner edges of the strips of the guideway by being placed therein and extending up through the spring-bar and attached thereto, substantially as set forth.

In testimony of the foregoing I have hereunto signed my name in the presence of two witnesses.

FREDERICK L. LOETZ.

Witnesses:
CHAS. A. STURGES,
CHRISTIAN RUCK.